United States Patent [19]

Rodgers

[11] Patent Number: 5,003,767
[45] Date of Patent: Apr. 2, 1991

[54] GAS TURBINE STARTER SYSTEM WITH POWER AUGMENTATION

[75] Inventor: Colin Rodgers, San Diego, Calif.

[73] Assignee: Sundstrand Corporation, Rockford, Ill.

[21] Appl. No.: 470,006

[22] Filed: Oct. 10, 1989

Related U.S. Application Data

[63] Continuation of Ser. No. 173,576, Mar. 25, 1988.

[51] Int. Cl.$^5$ .............................................. F02C 7/27
[52] U.S. Cl. .............................. 60/39.142; 60/39.141
[58] Field of Search ............. 60/39.142, 39.141, 39.07, 60/39.15

[56] References Cited

U.S. PATENT DOCUMENTS

| | | | |
|---|---|---|---|
| 2,839,893 | 6/1958 | Rothemund | 60/39.142 |
| 2,986,881 | 6/1961 | Moore . | |
| 2,994,194 | 8/1961 | Volk, Jr. . | |
| 3,066,487 | 12/1962 | Ferguson, Jr. . | |
| 3,098,626 | 7/1963 | Messinger | 60/39.142 |
| 3,171,252 | 3/1965 | Trowbridge et al. . | |
| 3,238,721 | 3/1966 | Brandes et al. . | |
| 3,750,394 | 8/1973 | Larsen et al. | 60/39.142 |
| 3,965,673 | 6/1976 | Friedrich . | |
| 4,077,202 | 3/1978 | Schutze | 60/39.142 |
| 4,161,102 | 7/1979 | Jasas et al. | 60/39.142 |
| 4,494,372 | 1/1985 | Cronin . | |
| 4,759,178 | 7/1988 | Joy | 60/39.142 |

FOREIGN PATENT DOCUMENTS

| | | | |
|---|---|---|---|
| 638875 | 3/1962 | Canada | 60/39.142 |
| 709142 | 5/1962 | Canada . | |
| 2053291 | 5/1972 | Fed. Rep. of Germany | 60/39.142 |
| 985391 | 12/1982 | U.S.S.R. . | |
| 957573 | 5/1964 | United Kingdom | 60/39.141 |
| 1136584 | 12/1968 | United Kingdom | 60/39.142 |

*Primary Examiner*—Donald E. Stout
*Attorney, Agent, or Firm*—Wood, Phillips, Mason, Recktenwald & VanSanten

[57] ABSTRACT

A power augmented gas turbine starter system which has a starter including a casing rotatably mounting a turbine wheel therewithin. A low pressure air supply communicates with the casing. A combustor is associated with the low pressure air supply for receiving air therefrom and supplying a flow of hot gas to the starter for augmenting the power of the starter. The air supply may be a bleed air conduit from an auxiliary power unit or from a main propulsion engine, and the combustor may be removably mounted directly in-line within the air supply conduit. The invention contemplates the use of a single auxiliary power unit and a single combustor for supplying a flow of hot gas to two or more gas turbine starters associated with their respective main propulsion engines. A cross-bleed circuit may be provided so that cross-bleed from one main engine can be used to start another main engine by providing bleed air for the other engine's gas turbine starter.

14 Claims, 2 Drawing Sheets

GAS TURBINE STARTER SYSTEM WITH POWER AUGMENTATION

This application is a continuation of application Ser. No. 173,576, filed Mar. 25, 1988 and now abandoned.

FIELD OF THE INVENTION

This invention generally relates to propulsion engine starters and, particularly, to a power augmented gas turbine starter system.

BACKGROUND OF THE INVENTION

Gas or air turbine starters have been used in many applications for purposes of providing torque to an engine, such as a main propulsion engine of an aircraft. Normally, the gas turbine starter is provided with a flow of air from some source, such as a bleed conduit from the main engine or an auxiliary power unit.

For instance, a frequent method of starting aircraft prime propulsion gas turbine engines is by means of a small auxiliary power unit providing compressed (bleed) air to an accessory drive gearbox mounted air turbine starter. The auxiliary power unit may be carried on-board, or mounted externally on ground support equipment. The majority of such auxiliary power units deliver a bleed pressure of approximately 4.0 psi at standard day conditions, as constrained by oil auto-ignition temperature limits no higher than 450°–550° F. for most commercial aircraft applications.

Requirements for in-flight cross-bleed starting of military propulsion engines at higher Mach numbers have necessitated accommodating bleed air duct internal temperatures of up to approximately 1200° F. In accommodating these higher bleed air duct internal temperatures, lines have had to be extensively insulated to maintain tolerable external surface temperatures.

This invention is directed to an improved system which significantly increases the output of the gas turbine starter by providing an additional or supplemental in-flow of hot gas to the starter, principally from a combustor means.

SUMMARY OF THE INVENTION

An object, therefore, of the invention is to provide a new and improved gas turbine starter system provided with power augmentation.

In the exemplary embodiment of the invention, a practical application of the concepts of the invention is shown in a power augmented gas turbine starter system which includes starter means having a casing rotatably mounting a turbine wheel therewithin. Low pressure air supply means communicates with the casing. Combustor means are associated with the low pressure supply means for receiving air therefrom and supplying a flow of hot gas to the starter means for augmenting the starter power. The low pressure air supply means may comprise a conduit in communication with the casing for receiving low pressure bleed air from an auxiliary power unit or from the main propulsion engine itself. Fuel to the combustor also may be provided from the fuel source of either the auxiliary power unit or the main engine.

It is contemplated that the combustor or power augmentor can be removably mounted so that the system can be readily adapted to different environments.

The concepts of the invention also are illustrated in an embodiment wherein an auxiliary power unit provides a flow of bleed air to a single combustor with hot air from the combustor being directed to an intake of two or more gas turbine starters each of which are associated with a respective main propulsion engine of the aircraft. Each starter provides the necessary torque to start its respective main engine. This embodiment contemplates that a cross-bleed circuit can be provided from the main engines whereby cross-bleed air from one engine, once started, can be used to augment starting of the other main engine by providing bleed air for the other engine's gas turbine starter. Thus, generally, the invention contemplates the use of high temperature ducting of hot output gas from the combustor remotely to air turbine starters which are not directly connected to the combustor.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
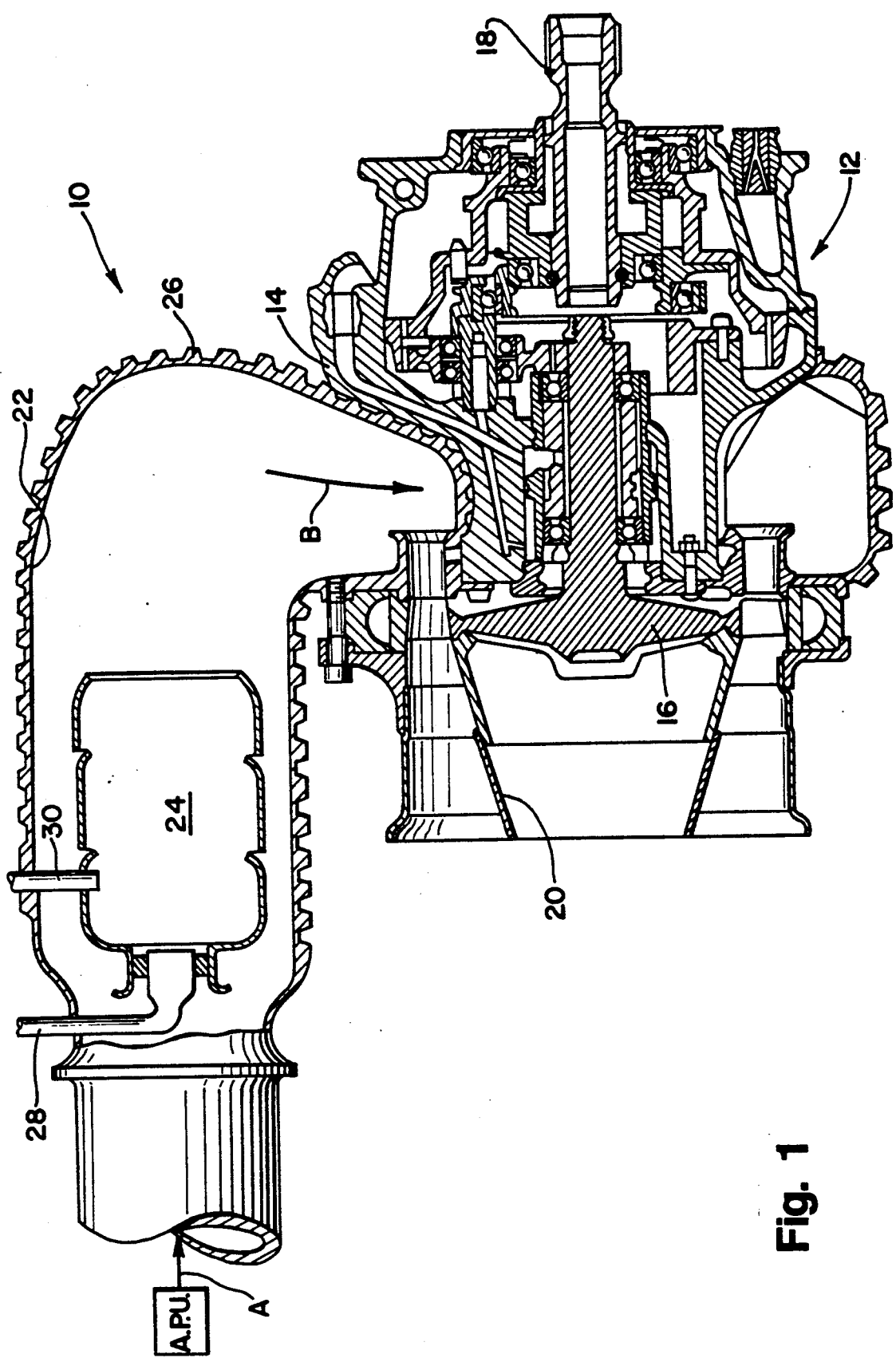
FIG. 1 is a sectional view through a gas turbine starter embodying the power augmenting system of the invention.

Referring to the drawings in greater detail, and first to FIG. 1, a power augmented gas turbine starter system, generally designated 10, is illustrated. The system is shown incorporated with starter means, generally designated 12, such as a gas turbine starter including a casing or housing 14 rotatably mounting a turbine wheel 16 therewithin. A splined shaft 18 extends from one end of the starter, and an exhaust diffuser 20 is provided at the opposite end of the starter. For brevity purposes, all of the detailed components of gas turbine starter 12 are not described herein. Suffice it to say, the starter is of conventional and widely known construction.

Low pressure air supply means are provided to starter 12, illustrated in the exemplary embodiment by means of a conduit 22. Low pressure bleed air is supplied to and through the conduit as indicated by arrow "A". The bleed air may be supplied from an auxiliary power unit (APU) or from a main propulsion engine cross-bleed, as described hereinafter.

The invention contemplates providing combustor means, generally designated 24, associated with the low pressure air supply means for receiving the bleed air and supplying a flow of hot gas, as indicated by arrow "B", to starter 12 for augmenting the power thereof. As shown, combustor means 24 may comprise a combustor mounted directly within conduit 22 for supplying the flow of hot gas directly to the starter through casing 14.

To this end, conduit 22 preferably should be provided with a heat shield 26.

Fuel is supplied to combustor 24 through a conduit 28. The fuel supply can be from either the auxiliary power unit fuel pump or from the fuel source for the main engine. An igniter for combustor 24 is generally shown at 30.

It is readily apparent from the description set forth above that the augmentor combustor 24 can be readily designed to be line-removable and used only in environments posing increased start difficulty. Although not shown in the drawings, any variety of removable mounting means, such as brackets or the like, can be used to removably mount combustor 24 within conduit 22.

Figure 2:
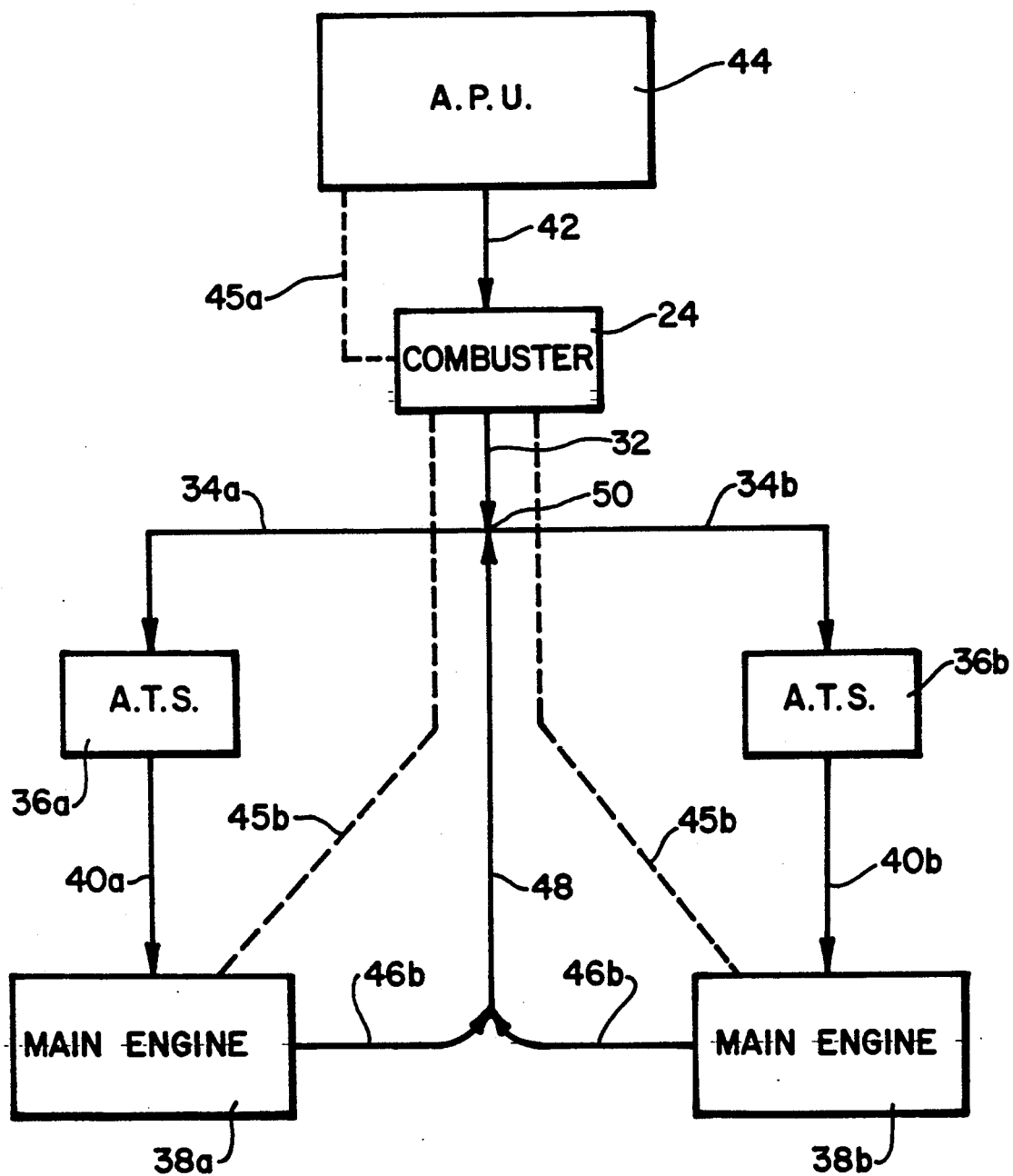
FIG. 2 is a schematic, block diagram illustrating the use of a single combustor for feeding hot air to a pair of air turbine starters and their respective main propulsion engines.

FIG. 2 shows a concept wherein a single combustor 24 is used for supplying a flow of hot gas through a conduit 32 and branch conduits 34a,34b to a pair of gas turbine starters 36a and 36b, respectively. Each starter is coupled to a respective main engine 38a and 38b, as indicated by lines 40a and 40b, respectively. Combustor 24 is supplied with bleed air, as at 42, from an auxiliary power unit 44.

Thus, output hot gas from the single combustor can be directed remotely to a plurality of air turbine starters which are not directly connected to the combustor. Fuel for the combustor can be supplied from the auxiliary power unit fuel pump, as at 45a, or from the engine fuel system, as at 45b.

FIG. 2 also illustrates a feature wherein a cross-bleed circuit is provided so that bleed air from one main engine 38a or 38b can be used to start the other main engine. Specifically, bleed lines 46a and 46b lead from main engines 38a and 38b, respectively, to a common cross-bleed line 48. The cross-bleed line leads back to the juncture 50 where conduit 32 from combustor 24 branches into branch conduits 34a,34b. Therefore, by using the cross-bleed circuit, cross-bleed air from one main engine can be used to start the other main engine by providing hot, low pressure bleed air for the other engine's air turbine starter.

A combustor, as contemplated by the invention, can provide a flow of hot gas typically about 1200° F. utilizing low pressure bleed air supply means. This would permit high temperature power augmentation with no starter modifications, such as changes in the starter nozzle and other components. The unit or system can be very compact with such low input parameters and relatively high temperature output, even removably incorporating the compact combustor directly in the bleed air supply conduit itself, as shown in FIG. 1.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A power augmented gas turbine starter system, comprising:
    starter means including a casing rotatably mounting a turbine wheel therewithin;
    low pressure air supply means communicating with the casing for providing a given volume of low pressure air directly to the starter means; and
    combustor means associated with the low pressure air supply means for receiving only a portion of said given volume of low pressure air therefrom and supplying a flow of hot gas to the starter means for augmenting the power thereof.

2. The system of claim 1 wherein said low pressure air supply means comprises conduit means with the combustor means mounted therewithin.

3. The system of claim 2, including fuel supply means through said conduit means to the combustor means.

4. The system of claim 1 wherein said system includes an auxiliary power unit, and wherein said low pressure air supply means comprises bleed air supply means from the auxiliary power unit.

5. The system of claim 4, including fuel supply means from the auxiliary power unit to the combustor means.

6. The system of claim 1, including means removably mounting the combustor means in the low pressure air supply means.

7. A power augmented gas turbine starter system for a main propulsion engine of an aircraft or the like, comprising:
    starter means including a casing rotatably mounting a turbine wheel therewithin;
    low pressure bleed air supply means from the main propulsion engine communicating with the casing for providing a given volume of low pressure air directly to the starter means; and
    combustor means associated with the low pressure bleed air supply means for receiving only a portion of said given volume of low pressure air therefrom and supplying a flow of hot gas to the starter means for augmenting the power thereof.

8. The system of claim 7, including fuel supply means from the main propulsion engine supply to the combustor means.

9. A power augmented gas turbine starter system for at least a pair of main propulsion engines, comprising:
    an auxiliary power unit for providing a given volume of low pressure bleed air directly to a starter means of the system;
    a combustor for receiving only a portion of said given volume of low pressure bleed air from the auxiliary power unit;
    at least a pair of gas turbine starters, one starter for each said engine; and
    conduit means between the combustor and each gas turbine starter for supplying a flow of hot gas to the starters from the combustor for augmenting the power of the starters.

10. The system of claim 9, including fuel supply means from the auxiliary power unit to the combustor.

11. The system of claim 9, including fuel supply means from the source for the main engines to the combustor.

12. A power augmented gas turbine starter system for at least a pair of main propulsion engines, comprising:
    an auxiliary power unit for providing a given volume of low pressure bleed air directly to a starter means of the system;
    a combustor for receiving only a portion of said given volume of low pressure bleed air from the auxiliary power unit;
    at least a pair of gas turbine starters, one starter for each said engine;
    conduit means between the combustor and each gas turbine starter for supplying a flow of hot gas to the starters from the combustor for augmenting the power of the starters; and cross-bleed circuit means from at least one main propulsion engine to the gas turbine starter of the other main propulsion engine for supplying a flow of hot gas to the starter once the one main propulsion engine is started.

13. The system of claim 12, including fuel supply means from the auxiliary power unit to the combustor.

14. The system of claim 12, including fuel supply means from the source for the main engines to the combustor.

* * * * *